(No Model.) 2 Sheets—Sheet 1.
T. H. McCRAY.
Steam Plow.
No. 234,882. Patented Nov. 30, 1880.
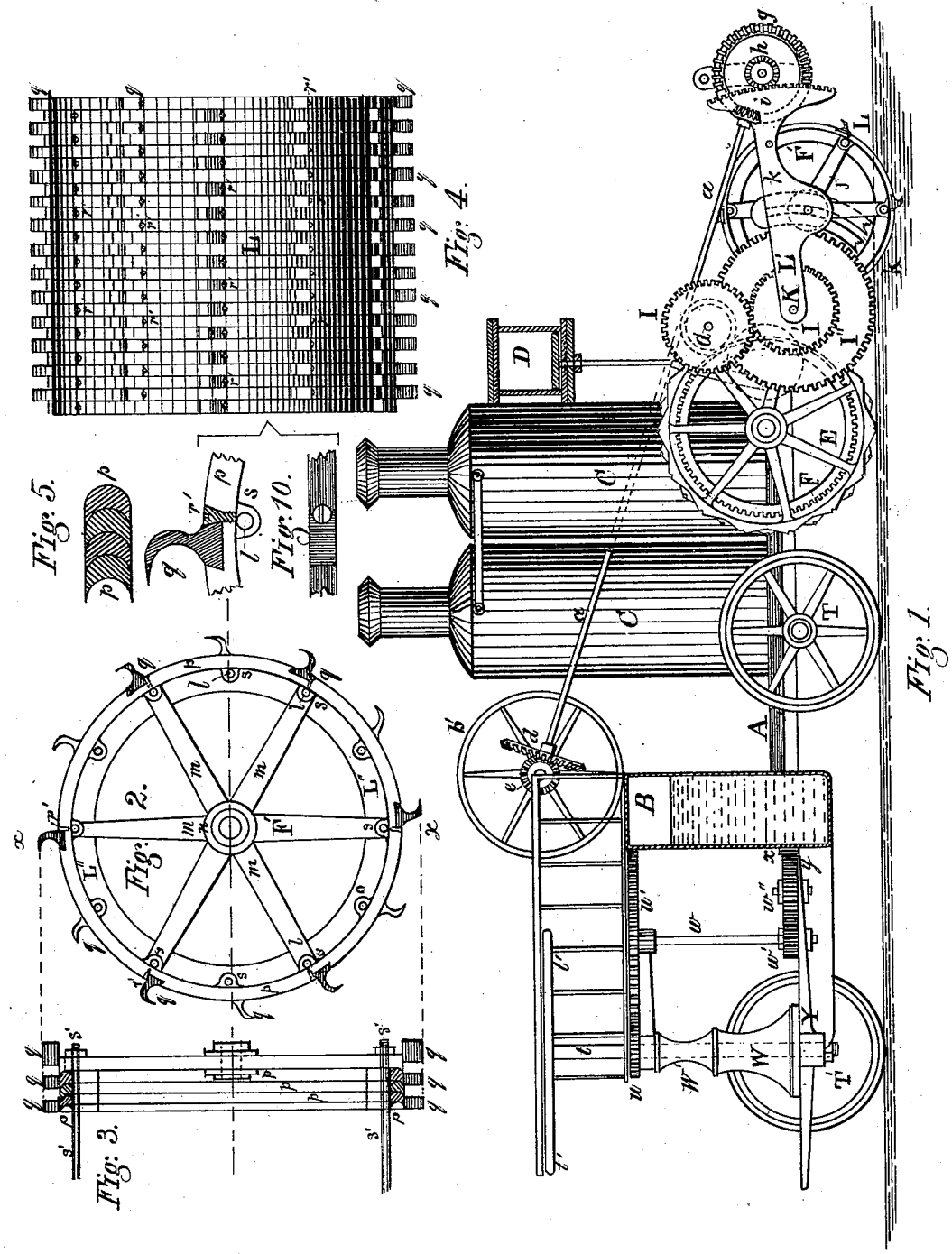
Witnesses
R. P. Edwards
A. K. Williams
Inventor
Thos. H. McCray
Per Wm. R. Singleton
Atty

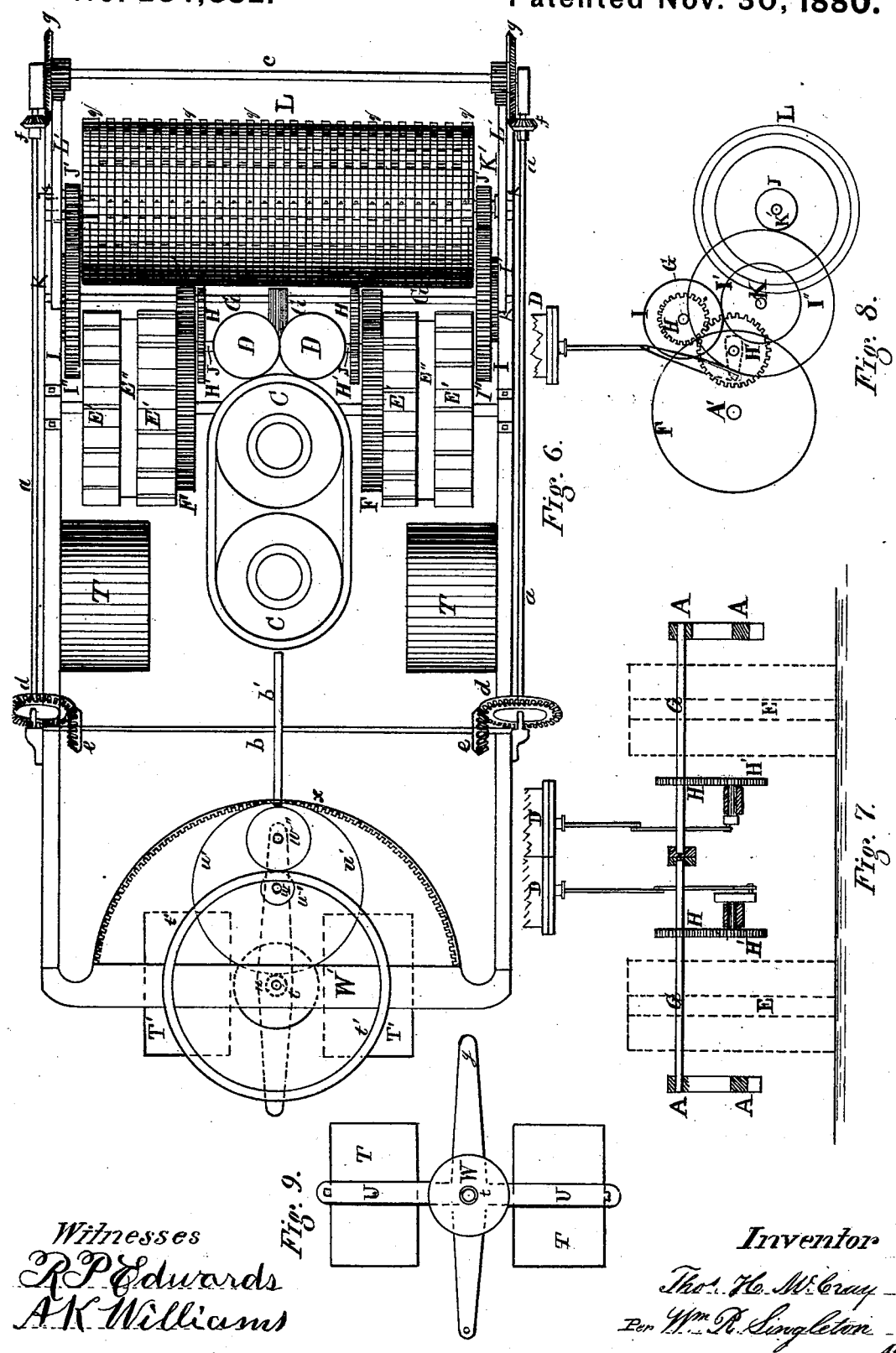

UNITED STATES PATENT OFFICE.

THOMAS H. McCRAY, OF TYRONZA, ARKANSAS.

STEAM-PLOW.

SPECIFICATION forming part of Letters Patent No. 234,882, dated November 30, 1880.

Application filed May 4, 1880. (No model.)

*To all whom it may concern:*

Be it known that I, THOMAS H. McCRAY, of Tyronza, in the county of Cross and State of Arkansas, have invented certain Improvements in Steam-Plows, of which the following is a specification.

This invention relates to improvements in steam-plows; and it consists in the construction of the plow-cylinder and in the manner in which the plow points or teeth are secured therein, all of which will be hereinafter more fully described and shown.

Figure 1 is a side elevation, partly in section to show certain details of construction. Fig. 2 is a vertical section of the plow-cylinder. Fig. 3 is a section of Fig. 2 on line $x\ x$. Fig. 4 is a side view of a part of the plow-cylinder. Fig. 5 is an enlarged section of the rings, showing their concave and convex form. Fig. 6 is a plan view of the steam-plow. Fig. 7 is a side view of the crank and driving shafts in connection with the steam-cylinders. Fig. 8 shows the end view of Fig. 7; Fig. 9, details of steering-wheel, frame, &c.; Fig. 10, details of plow-teeth.

A is the frame, which is made of iron, and is to be light and strong to sustain the water-tank B, the boilers C C, the engine-cylinders D D, the shafts, gearing, and the plow-cylinder.

E E are the driving-wheels, which are made with a wide tread, having the same divided into three sections, E′, E′, and E″. E′ E′ are formed of serrations or scallops so arranged that they alternate with each other, the points of one being opposite the inner angles of the other. Between these serrated or scalloped sections E′ E′ the section E″ is cylindrical and of less diameter than the others, and consequently prevents the wheels from burying too deeply in the ground. The points of sections E′ E′ are notched for the purpose of permitting the teeth to take firm hold upon hard ground.

On the wheels E E are spur-gear wheels F F, which engage with pinions F′ F′ on shafts G G, which shafts are supported at their inner ends upon a standard, G′. On these shafts G G are also other gear-wheels, H H and I I. H H engage with wheels H′ H′ on the separate crank-shafts J J, which are driven by the piston-rods and pitmen of the cylinders D D, which are represented in the drawings as being vertically attached to the rear of the boiler; but they may be arranged and located in any other position, either horizontally or inclined, to suit the peculiar circumstances of each machine. The separate cylinders and connections enable the machine to be turned in any direction or entirely around by going ahead with one engine and reversing the other, whereby, with the use of the steering apparatus in front, (yet to be described,) the machine can be turned in a very short space and very rapidly.

The gear-wheels H′ H′, being driven from the cylinders, move the wheels H H on shafts G G, and also the pinions F′ F′, which turn the spur-wheels F F, and with them the driving-wheels E E, and thus the machine is carried forward. The spur-wheels I I on shafts G G at their outer ends mesh into similar wheels I′ I′ on a shaft, K, some distance below shaft G. At each end of shaft K is a spur-wheel, I″, which meshes with pinions J′ J′ on the ends of the plow-cylinder shaft K′.

In Fig. 8 is represented the connection of the gearing for driving the wheels E E, which are on the main shaft A′, and also the gearing for driving the plow-cylinder L. Two wheels, H H′, are represented with cogs. All the others have only the pitch-lines represented to avoid confusion.

In Fig. 1 is represented the gearing of I, I′, and I″ outside of the driving-wheels E E, which conceal part of the cogs on spur-wheel F attached to the driving-wheels E E, and run with the wheels loosely on the axle or shaft A′.

Whenever the machine is moved forward by the driving-wheels the plow-cylinder is rotated by the gears I, I′, I″, and J′.

Clutches are so arranged that the plow-cylinder may be thrown out of gear when the machine is to be moved from place to place. These are not shown in the drawings. The plow-cylinder can also be elevated at the same time by an apparatus to be described hereinafter.

L is the plow-cylinder, which extends across the rear end of the machine the whole width between the sides of the frame A. It is supported on a substantial shaft, K′, the outer ends of which shaft rest in bearings on levers L', which, at their inner ends, are pivoted to the shaft K. Shaft K' extends at each end through levers L' L' and into segment-grooves $k$ $k$ in curved standards attached to frame A on each side of the machine, Fig. 1, which grooves serve as guides and supports to the ends of shaft K' as the plow-cylinder is moved up and down, which movement is accomplished by means of the rods $a$ $a$ and $b$, the beveled gears $d$ $d$ $e$ $e$ $f$ $f$ $g$ $g$, and the pinions $h$ $h$ on the rear shaft, $h'$, and segment-racks $i$ $i$ on the outer ends of the supporting-levers L' L', all of which are operated by the hand-wheel $b'$ on shaft $b$, supported on the water-tank B, and placed thereon convenient to the steering-wheel $t'$ and apparatus to be described.

The plow-cylinder L, the construction of which forms an important part of my invention, is made as follows, viz: On shaft K' are placed a middle and two outer centers strongly braced and secured on the shaft, and one of which is seen in side view in Fig. 2, letter L''. It may be attached in any substantial manner, having as many spokes or arms as the strength may require. Outside of these centers L'' are rings $p$ $p$, touching each other from one end to the other of the cylinder, having concavo-convex sides. (Shown in cross-section in Fig. 5.) The periphery of these rings is divided into six sections, and at each point, immediately over the ends of the spokes, there is a dovetail groove across the face of the ring, into which the base of a tooth or cutting-point, $r$ $r$, is inserted and firmly held by a dovetail screw-bolt, $r'$ $r'$. Beneath each tooth, and intermediate between these, are lugs $s$, having holes $l$ for the reception of long bolts $s'$ $s'$, which extend the entire length of the plow-cylinder, and which pass also through corresponding holes in the three center-pieces and have nuts on the exterior of the two outside centers, and to which all the bolts are firmly secured, thus binding all the rings and the three centers firmly together, and yet, when repairs are necessary, the whole can be taken apart in the field, and any repairs be there made without sending the machine to the shops—a feature highly important in consideration that a plowing-machine must be necessarily employed at long distances from any manufacturing center or machine-shop. Each machine can be supplied with extra rings and a large number of cutting points or teeth, as these are most liable to breakage and derangements. The teeth in alternate rings are half-way arranged, so that in adjoining rings they do not range with each other. They are on the edge as wide as the ring. Hence every part of the ground is cut up by the teeth and duly pulverized. The two outer rings have teeth of double width. The extra half, hanging beyond the end of the cylinder, cuts so much beyond the line of travel of the cylinder, as seen in Fig. 3.

Under the frame, and near the middle, are two supporting-wheels, T T, which have strong springs on which the weight of the machine is supported, and to allow for the adjustment of the wheels in passing over uneven ground. The front wheels, T' T', are attached to an axle, U, which is a part of a cross-shaped frame, W, (seen in Fig. 9,) from the center of which is a vertical rod, $t$, having at its upper end a hand-wheel, $t'$. On said rod $t$ is a pinion-wheel, $u$, meshing with a spur-gear, $u'$, which is on a vertical rod, $w$, and at the bottom of which rod $w$ is a pinion, $w'$, meshing into a larger wheel, $w''$, which engages with its cogs in a circular cogged rack, $x$, secured on the curved surface of the water-tank B, these wheels $w'$ and $w''$ being supported on the arm $y$ of the cross-frame Y, so that by moving the hand-wheel the pinion $u$ moves wheel $u'$, and with it $w'$ and $w''$, which working into rack $x$, the wheel $w''$ is carried around, and consequently, its supporting-arm $y$ being a lever, carries the frame W and the axle, with the front wheels, T'T', correspondingly in any direction required, thus steering the machine, and, when necessary, assisting in the operation of turning entirely around.

I claim—

1. In steam-plows, a rotary plow-cylinder composed of rings having concavo-convex cross-sections, substantially as and for the purpose described.

2. The rings of the plow-cylinder, in combination with the cutting points or teeth inserted in a dovetailed socket and secured by dovetailed or conical-headed screws inserted from above, substantially as and for the purpose described.

3. The combination of the series of concavo-convex rings $p$ $p$, having eyes $s$, the centers L'', and longitudinal screw-bolts $s'$ with the shaft K', substantially as and for the purpose described.

THOMAS H. McCRAY.

Witnesses:
WM. R. SINGLETON,
R. P. EDWARDS.